United States Patent Office 2,782,460
Patented Feb. 26, 1957

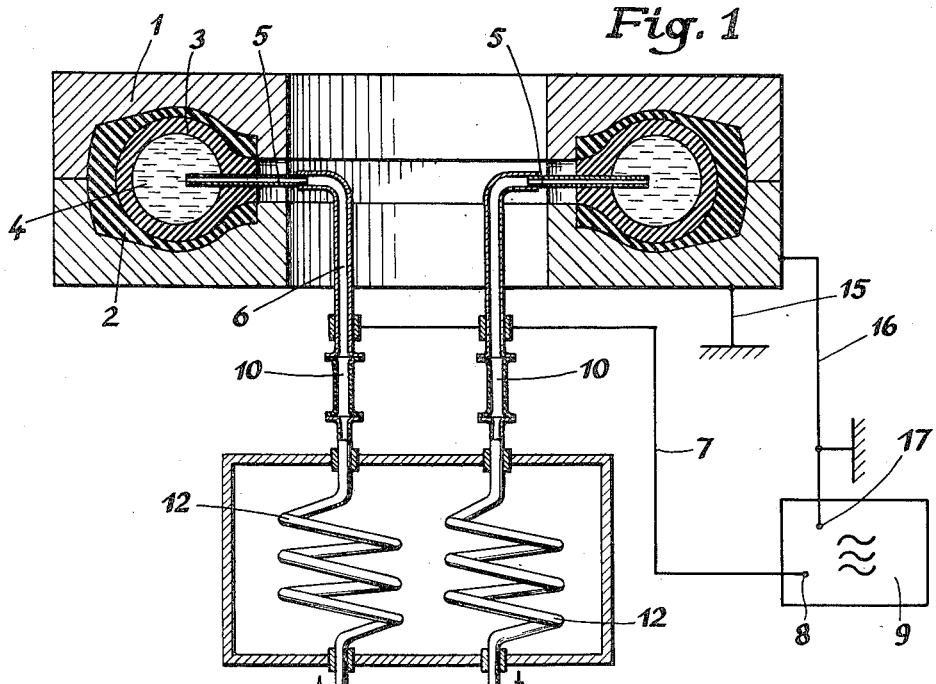
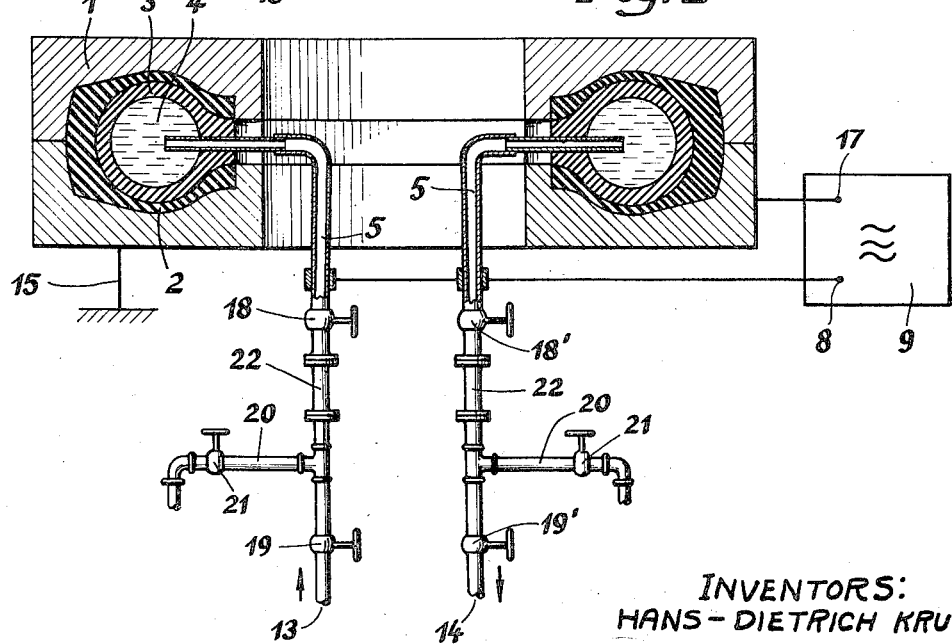

2,782,460

ARRANGEMENT FOR DIELECTRIC HEATING

Hans-Dietrich Krug and Heinrich Bauermeister, Hannover, Germany, assignors to Firma Continental Gummi-Werke A. G., Hannover, Germany, a corporation of Germany Application July 15, 1953, Serial No. 368,177

Claims priority, application Germany July 19, 1952

6 Claims. (Cl. 18—6)

This invention relates to dielectric heating of work members, particularly to the heating thereof for vulcanization, and more particularly to the heating of vehicle tires and similar articles.

In the manufacture of articles such as automobile tires, it is customary to place the tires in a mold, and to apply pressure to the inside of the tire to force it out into intimate contact with the mold and to apply heat to the tire in the mold to effect the vulcanization thereof. Usually steam, or another hot fluid is employed for elevating the temperature of the tire to the desired amount.

The heating of an article, such as a tire casing, in this manner has certain serious faults in connection therewith. In the first place, this manner of curing a tire casing takes considerable time, and, in the second place, there is a tendency for the tire to either overcure at the point of application of heat thereto, or to undercure at those portions of the tire most remote from the application of heat.

Having the foregoing in mind, it is a primary object of this invention to provide an arrangement particularly adapted for the vulcanization of tires, but also useful in connection with other articles of this nature, which will eliminate the difficulties referred to above.

Another object is the provision of an arrangement for curing or vulcanizing a tire casing or similar article in a mold, so that uniform curing of the entire casing is effected and in a minimum length of time.

In general, the various objectives of this invention are attained by generating the heat in the tire casing in a high-frequency electric field. Inasmuch as such an electric field in order to provide for the proper transfer of energy to the article being heated, involves the use of high voltages, the present invention contemplates the grounding of those parts of the mold containing the article being treated that might be touched by the operators, with the high voltage being effected internally of the mold, thereby creating safe conditions.

In particular, this invention is carried out by applying internal pressure to the article being molded and cured by an electrically conductive fluid, such as brine, whereby the electrical energy can readily be conducted to the interior of the article being treated and uniformly distributed thereabout.

A feature of the present invention which comes about by the use of an electrically conductive fluid as referred to is that substantially conventional vulcanizing equipment, including the machines, forms, and molds, can be utilized in the practice of our invention, with only minor constructional changes.

It will be understood that an entirely different vulcanizing arrangement could be constructed utilizing the principles of this invention, but the advantage exists that old equipment can be employed without extensive modification thereof.

According to one modification of the present invention, the electrically conductive fluid is delivered from a fluid source under pressure into the internal mold part, and then passes therefrom to drain, with the pipes that conduct the fluid to and from the inner mold part being utilized for conveying electrical energy into the said fluid.

Still another feature of this invention deals with the provision of means in connection with such pipes for preventing loss of electrical energy therethrough to the said fluid source or to the said drain. Such means would advantageously take the form of an insulating section in said pipes, together with portions of the pipes, in the form of coils, so that they act as choke coils, thus establishing a high impedance that prevents any substantial loss of electrical energy through said pipes.

It will be understood, of course, that while the said fluid is electrically conductive, the degree of conductivity thereof is relatively small as compared to that of the pipes, so that by preventing loss of energy through the pipes, the loss of energy is maintained at an economical level.

According to another modification of our invention, means are provided for filling the inner mold part with electrically conductive fluid under pressure, and then electrically isolating the inner mold part and the filling pipes therefor in the immediate vicinity of the inner mold part from the remainder of the said pipes, the fluid source, and drain, so that there will be substantially no electrical energy loss through the pipes, even without the provision of portions thereof formed to choke coils.

Having reference now to the drawings, Figure 1 diagrammatically illustrates one form which our invention can take, and Figure 2 illustrates a somewhat modified arrangement.

In Figure 1 there is shown a tire mold 1, having therein a tire 2, to be cured, and within which tire there is the expansible inner mold part 3. The inside of the inner mold part 3 is filled with an electrically conductive fluid 4, which is maintained within the inner mold part 3 under a predetermined pressure during the curing of the tire.

The fluid within the inner mold part 3 is adapted for being supplied thereto and withdrawn therefrom by the pipes 5. Pipes 5 are connected with pipes 6 which are electrically interconnected with each other and with one pole 8 of the high-frequency electric generator 9 by a wire 7. The pipes 5 and 6 thus serve for the introduction and removal of the fluid from the inner mold part 3, and simultaneously act as lead-ins for the electrical energy that is supplied to the liquid 4 within the inner mold part.

The pipes 6, outwardly from their interconnection by wire 7, comprise the electrical insulating sections 10 which, in turn, are connected by the metallic pipes 12, as at 13, to a source of fluid under pressure, and, as at 14, to a drain connection such as a sewer. Pipes 12 are shaped spirally, thus forming choke coils which resist the passage of high-frequency electrical energy therethrough, and thus, together with the insulating sections 10, prevent any substantial loss of the high-frequency, high voltage energy from the wire 7 to the source of fluid pressure or to drain. The outer mold part 1 is grounded as by the wire 15 and is also directly connected, as by the grounded wire 16, to a second pole 17 of the generator 9.

It will be evident upon inspection of Figure 1, that the outer part of the mold is always at ground potential, and that, accordingly, there is little opportunity for anyone to become injured due to accidentally coming in contact with the high voltage side of the circuit.

Referring now to Figure 2, wherein corresponding reference numerals have been applied where applicable, a somewhat different arrangement is employed for preventing loss of electrical energy from the tire mold. In this figure, the inlet pipes to the inner mold part include the spaced shut-off valves 18, 18', 19, 19'. Leading off from between the said valves in each pipe are the pipe branches 20, each of which is provided with a shut-off valve 21. Between each of the valves 18, 18' and the point of connection to the corresponding pipe of the branch pipes 20, are the insulating sections 22.

In the operation of the arrangement of Figure 2, valves 21 are closed and the other valves in at least one of the inlet pipes are open. After the pressure fluid has built up within the inner mold part, the valves 18, 18', 19, and 19' are closed, and the valves 21 are opened. Any of the electrically conductive fluid which might then be contained between the branch pipes 20 and the closed valves 18 is thus drained off, and because of the provision of the insulating sections 22, the inner part of the tire mold is effectively insulated against any loss of electrical energy during the curing of the tire casing.

From the foregoing, it will be seen that the two modifications illustrated have in common the important features of this invention of providing means for dielectrically heating in a high-frequency electric field, a work member, such as a tire casing, which is substantially completely surrounded by an outer mold part that is grounded, while a not readily accessible inner mold part is maintained at a high voltage, oscillating at high frequency, while the said inner mold part is maintained filled with an electrically conductive fluid adapted for being supplied thereto through a conduit system arranged to inhibit or prevent the loss of electrical energy therethrough.

It will be understood that this invention is susceptible to modification in order to adapt it to different usages and conditions, and, accordingly, it is desired to comprehend such modifications within this invention as may fall within the scope of the appended claims.

We claim:

1. In an arrangement for heating articles of dielectric material, such as vehicle tire parts; an electricity conductive outer mold part adapted for receiving therein the tire part to be heated, an expansible inner mold part for being placed within the said tire part, an electrically conductive fluid under pressure filling expansible inner mold part, a high-frequency electric generator having two poles, means connecting one of said poles to ground and to said outer mold part, and means effecting electrical connection between the other of said poles and said conductive fluid.

2. An arrangement for heating articles of dielectric material, such as vehicle tire parts; an electrically conductive outer mold part adapted for receiving therein the tire part to be heated, an expansible inner mold part adapted for being received within the said tire part, electrically conductive means within said inner mold part and forming an electrode, pipes connected with said inner mold part for supplying an electrically conductive fluid therein under pressure, a high-frequency electric generator having two poles, means connecting one of said poles to ground and to said outer mold part, and means connecting the other of said poles to said pipes for effecting electrical connection of the said other pole with said electrically conductive fluid.

3. In an arrangement for vulcanizing a vehicle tire casing; an electrically conductive outer mold part for receiving therein an article of dielectric material, an inner mold part adapted for being placed within said article, a source of electrically conductive fluid under pressure, pipe means leading from said source to said inner mold part and from said inner mold part to drain, a high-frequency electric generator having one pole connected to ground and to said outer mold part, means electrically connecting the other pole of said generator with the said pipe means for effecting electrical connection between the fluid in said inner mold part and said other pole, and means effectively isolating said fluid source and said drain from the high-voltage established in the fluid in said inner mold part.

4. An arrangement as set forth in claim 3 in which the said means isolating the source of fluid and the drain comprises metallic choke coils formed in the said pipe means between the said source and drain and the connection of the said other pole with said pipe means.

5. An arrangement according to claim 4 in which the said means for isolating also includes insulating sections in said pipe means.

6. An arrangement according to claim 3 in which the said means for insulating said source and drain comprises insulating sections in the said pipe means between the source and drain and the point of connection with said pipe means with said other pole, and valve means in the pipe means operable to permit entrapping fluid in said inner mold part while draining the said insulated sections of said pipe means.

References Cited in the file of this patent

UNITED STATES PATENTS

| | | |
|---|---|---|
| 2,438,952 | Te Grotenhuis | Apr. 6, 1948 |
| 2,541,644 | Enabnit | Feb. 13, 1951 |
| 2,599,360 | Batiuk et al. | June 3, 1952 |